United States Patent [19]

Tashiro et al.

[11] Patent Number: 5,138,018
[45] Date of Patent: Aug. 11, 1992

[54] ONE-PACK TYPE EPOXY RESIN COMPOSITION CONTAINING REACTION PRODUCTS OF EPOXY RESIN, DIALKYLAMINOALKYLAMINES AND UREA

[75] Inventors: Kijuro Tashiro; Ritaro Nagabuchi, both of Miyoshi, Japan

[73] Assignee: Fuji Kasei Kogyo Co. Ltd., Tokyo, Japan

[21] Appl. No.: 620,787

[22] Filed: Dec. 3, 1990

[30] Foreign Application Priority Data

May 12, 1989 [JP] Japan .................. 1-315944

[51] Int. Cl.$^5$ ............................................. C08G 59/50
[52] U.S. Cl. ....................................... 528/111; 528/120; 525/526
[58] Field of Search .................... 528/111; 525/526

[56] References Cited

U.S. PATENT DOCUMENTS

| 4,014,954 | 3/1977 | Gude et al. ................ 528/120 |
| 4,360,649 | 11/1982 | Kamino et al. ............. 528/100 |
| 4,542,202 | 2/1985 | Takeuchi et al. ........... 528/119 |
| 4,689,390 | 8/1987 | Suzuki et al. .............. 528/118 |

FOREIGN PATENT DOCUMENTS

| 51-14979 | 5/1976 | Japan . |
| 61-155420 | 7/1986 | Japan . |
| 62-146915 | 6/1987 | Japan . |
| 1254731 | 4/1988 | Japan . |

Primary Examiner—John C. Bleutge
Assistant Examiner—Frederick Krass
Attorney, Agent, or Firm—Fred Philpitt

[57] ABSTRACT

A one-pack type epoxy resin composition which can be easily handled and has excellent curing characteristics is provided by blending at least one epoxy resin having more than one epoxy groups in a molecule with a curing agent obtained by reacting at least one diamine compound, at least one N,N-dialkylaminoalkylamine, at least one epoxy resin having more than one epoxy groups in a molecule, urea, and as an optional component, at least one monoamine compound.

3 Claims, No Drawings

ONE-PACK TYPE EPOXY RESIN COMPOSITION CONTAINING REACTION PRODUCTS OF EPOXY RESIN, DIALKYLAMINOALKYLAMINES AND UREA

BACKGROUND OF THE INVENTION

1. Field of the Invention

The present invention relates to a one-pack type epoxy resin composition.

Epoxy resins having an oxirane ring in their molecule, when combined and mixed with various curing agents, may be cured at ambient temperature or elevated temperature. Since the cured epoxy resins have excellent adhesion to various materials, they have been used in variety of fields of application such as adhesives and coatings, and in injection, dipping, casting and potting. The present invention is to provide, in the fields relating to epoxy resins, an epoxy resin composition which can be easily handled and has excellent curing characteristics. More concretely, the present invention is to provide a one-pack type heat curing epoxy resin composition which has excellent storage stability and can be cured in a short period of time at a relatively low temperature.

2. Description of the Prior Art

Most of the conventional epoxy resin compositions are of two-pack type, and they are used immediately after mixing an epoxy resin and a curing agent. Although two-pack type epoxy resin composition may be cured at room temperature or low temperature, they must be precisely metered and mixed just prior to use. When wrong amounts are metered relative to the correct amounts of the epoxy resin and the curing agent, or subsequent mixing is not sufficient even if correct amounts are metered, there is a problem that the performance of the cured epoxy resin is insufficient. Also, limited pot life of conventional two-pack type epoxy resin compositions makes their adaptability to automated machines difficult. Thus, it is desired to produce one-pack type heat curing epoxy resin compositions to eliminate these drawbacks. One-pack type heat curing epoxy resin compositions need a latent-type curing agent which has a property of not reacting with an epoxy resin at room temperature but starting reaction to cure upon heating. Some latent-type curing agents have been proposed so far, and typically, there may be mentioned dicyandiamide, dibasic acid dihydrazides, boron trifluoride amine complex salts, guanamines, melamine and imidazole compounds. Although, mixtures of dicyandiamide, melamine or a guanamine with an epoxy resin are excellent in storage stability, they have a drawback of necessitating a curing condition at a high temperature above 150° C. for long period of time. Although, it has been widely done to shorten the curing time by the use of a curing accelerator, this accompanies a drawback that storage stability is extremely damaged. Also, dibasic acid dihydrazides and imidazole compounds have poor storage stability even though they cure the epoxy resin at a relatively low temperature. Boron trifluoride amine complex salts have advantages of excellent storage stability and short curing time. But they cause corrosion of metals. Thus, each of curing agents have a drawback. Under such circumstances, the applicants have studied and tried to develop an epoxy resin composition which have excellent storage stability and can be cured at a low temperature in a short period of time, and have attained the present invention.

The present invention is also an improvement to the curing characteristics of the invention of Japanese Unexamined Publication No. Hei 1-254731, and provides an epoxy resin composition which can be cured at a relatively low temperature, i.e. at 80° to 100° C., and yet in a short period of time, while maintaining good storage stability.

SUMMARY OF THE INVENTION

The present invention relates to a one-pack type heat curing epoxy resin composition which comprises as effective components (A) at least one epoxy resin having more than one epoxy groups in a molecule, and (B) a curing agent prepared by reacting (a) at least one diamine compound having two amino groups, (b) at least one N,N-dialkylaminoalkylamine represented by the general formula

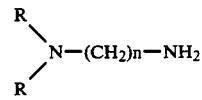

wherein R is alkyl group of 1 to 4 carbon atoms, and n is an integer of 2 or 3, and as an optional component, (e) at least one monoamine compound represented by the general formula X—NH$_2$ wherein X is benzyl, cyclohexyl, or alkyl group of 3 to 8 carbon atoms with (c) at least one epoxy resin having more than one epoxy groups in a molecule and (d) urea.

The composition has an excellent storage stability and can be rapidly cured at a relatively low temperature.

DETAILED DESCRIPTION OF THE INVENTION

The epoxy resin (A) used in the present invention includes, but not limited to, for example, glycidyl ether obtained by reacting epichlorohydrin with a polyhydric phenol such as bisphenol A, bisphenol F, bisphenol S, hexahydrobisphenol A, tetramethylbisphenol A, catechol, resorcinol, cresol, novolak, tetrabromobisphenol A, trihydroxybiphenyl, benzophenone, bis-resorcinol, bis-phenol hexafluoroacetone, hydroquinone, tetramethylbisphenol A, tetramethylbisphenol F, triphenylmethane, tetraphenylethane and bixylenol; polyglycidyl ethers obtained by reacting epichlorohydrin with an aliphatic polyhydric alcohol such as glycerin, neopentyl glycol, ethylene glycol, propylene glycol, butylene glycol, hexylene glycol, polyethylene glycol, polypropylene glycol; glycidyl ether esters obtained by reacting epichlorohydrin with a hydroxycarboxylic acid such as p-hydroxybenzoic acid, beta-hydroxynaphthalene carboxylic acid; polyglycidyl esters obtained from a polycarboxylic acid such as phthalic, methylphthalic, isophthalic, telephthalic, tetrahydrophthalic, hexahydrophthalic, endomethylenetetrahydrophthalic, endomethylenehexahydrophthalic, trimellitic, and polymerized fatty acid; glycidylaminoglycidyl ether obtained from aminophenol or aminoalkylphenol; glycidylaminoglycidyl ether obtained from aminobenzoic acid; glycidylamine obtained from aniline, toluidine, tribromoaniline, xylylenediamine, diaminocyclohexane, bisaminomethylcyclohexane, 4,4'-diaminodiphenylmethane, 4,4'-diaminodiphenyl sulfone or the like; and mono-epoxy compounds exemplified by epoxypolyolefin, glycidylhydantoin, glycidylalkylhydantoin, triglycidyl cyanurate, butylglycidyl ether, phenylglycidyl ether, alkylphenylglycidyl ether, glycidyl ester of benzoic acid, styrene oxide and the like; as well as mixtures of one or more of these compounds.

The other essential component of the present invention, the curing agent may be obtained by reacting (B)(a) a diamine compound having two amino groups, (B)(b) a N,N-dialkylaminoalkylamine, and (B)(e) an optional monoamine compound with (B)(c) an epoxy resin having more than one epoxy groups in a molecule and (B)(d) urea. As a diamine compound (B)(a) having two amino groups used herein, there may be mentioned metaxylylenediamine, 1,3-bis-aminomethylcyclohexane, isophoronediamine, diaminocyclohexane, phenylenediamine, tolylenediamine, diaminodiphenylmethane, diaminodiphenyl sulfone, hexamethylenediamine, ethylenediamine, propylenediamine, diaminobutane, 1,12-dodecanediamine, and the like. Among others, metaxylylenediamine, 1,3-bisaminomethylcyclohexane, and isophoronediamine are preferred.

As N,N-dialkylaminoalkylamine (B)(b) represented by the general formula

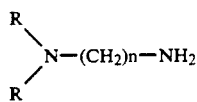

there may be mentioned dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, and the like. Among others, dimethylaminopropylamine and diethylaminopropylamine are preferred, As monoamine compound (B)(e) represented by the general formula X—$NH_2$, there may be mentioned butylamine, isobutylamine, sec-butylamine, 1,2-butylamine, 1,2-dimethylpropylamine, hexylamine, 2-ethylhexylamine, benzylamine, and cyclohexylamine. Among others, butylamine, benzylamine, and cyclohexylamine are preferred.

As epoxy resin (B)(c) used in the present invention, epoxy resins defined for epoxy resin (A) may be used. Among others, bisphenol A type epoxy resin having an epoxy equivalent weight of about 190, bisphenol F type epoxy resin having an epoxy equivalent weight of about 175, glycidylaniline, and glycidylorthotoluidine are preferred.

The curing agent, one of the essential components of the present invention, can be obtained by carrying out addition reaction of the amine compounds (B)(a), (B)(b) and optional component (B)(e) with the epoxy resin (B)(c) in an inert gas at a temperature of 50° to 150° C., preferably 80° to 130° C. for 1 to 3 hours followed by ammonia releasing reaction with urea at a temperature of 150° to 240° C., preferably 160° to 220° C. for 1 to 5 hours.

Further preferred synthesis for better storage stability is to carry out addition reaction of amine(B)(a) having two amino groups and epoxy resin (B)(c) at a temperature of 50° to 150° C., preferably 80° to 130° C. for 1 to 3 hours to obtain an amine-epoxy adduct, to which is added amine compound (B)(b) and optional amine compound (B)(e), followed by reaction with urea at 150° to 240° C., preferably 160° to 220° C. for 1 to 5 hours. The product is a light yellow solid which may be divided into any particle size.

The ratio of N,N-dialkylaminoalkylamine (B)(b) and monoamine compound (B)(e) which play a role of a molecular weight regulator to diamine compound (B)(a) is such that the sum of N,N-dialkylaminoalkylamine (B)(b)+monoamine compound (B)(e) to one mole of diamine compound (B)(a) having two amino groups is within the range of 0.5 mole$\leq$(B)(b)+(B)(e)$\leq$2.0 moles, preferably 0.6 mole$\leq$(B)(b)+(B)(e)$\leq$1.5 moles.

A used amount of (B)(b)+(B)(e) of smaller than 0.5 mole results in a product of a large molecular weight which may cause gelation. A used amount of (B)(b)+(B)(e) of greater than 2.0 moles results in a product of a sticky solid which can hardly be divided and which deteriorates storage stability of the epoxy resin composition.

To improve the storage stability without increasing the molecular weight, monoamine compound (B)(e) may optionally be used in an amount within the range of 0$\leq$(B)(e)$\leq$3.0 moles, preferably 0$\leq$(B)(e)$\leq$2.0 moles per one mole of N,N-dialkylaminoalkylamine (B)(b). A used amount of (B)(e) of more than 3.0 moles results in an insufficient fast curing rate at low temperatures.

The ratio of epoxy resin (B)(c) is 0.05 equivalent$\leq$(B)(c)$\leq$0.7 equivalent, preferably 0.1 equivalent$\leq$(B)(c)$\leq$0.5 equivalent to one equivalent of amino group in the amine compound (B)(a), (B)(b) and (B)(e). The used amount of (B)(c) of smaller than 0.05 equivalent results in insufficient curing rate at low temperatures and the amount of (B)(c) of greater than 7.0 equivalents results in insufficient curing rate at low temperatures as well as poor storage stability.

The blended amount of urea (B)(d) is in the range of 0.2 mole$\leq$(B)(d)$\leq$0.6 mole, preferably 0.3 mole$\leq$(B)(d)$\leq$0.5 mole to one equivalent of amino group in the amine compounds (B)(a), (B)(b) and (B)(e). The used amount of 0.2 mole or smaller results in a product having a low melting point and poor storage stability, and the used amount of 0.6 mole or greater results in a product of a large molecular weight which gels.

The ratio of the epoxy groups in (B)(c) and the $NH_2$ groups in (B)(d) to the amino groups in the amine compounds (B)(a), (B)(b) and (B)(e) is such that the sum of the epoxy groups in (B)(c) and the —$NH_2$ groups in (B)(d) to one amino group in (B)(a), (B)(b) and (B)(e) is in the range of 1.0$\leq$epoxy groups in (B)(c)+ —$NH_2$ groups in (B)(d)$\leq$1.4. A used amount smaller than 1.0 results in a sticky product which is poor in storage stability. A used amount greater than 1.4 results in a highly viscous product which cannot be taken out easily from a reactor.

The composition of the present invention can be obtained by mixing and dispersing a powdery curing agent with a epoxy resin. When the epoxy resin is a liquid it is preferred to blend a curing agent therewith in predetermined ratio and further mix and disperse them sufficiently by using a device like a mortar. When the epoxy resin is a solid, it is preferred to use preliminarily finely crushed epoxy resin and mix it sufficiently with a curing agent.

The blending amount of the curing agent to the epoxy resin differs depending on the type of the epoxy resin, particularly the concentration of the epoxy groups in the epoxy resin, and is within the range of 1 to 40 parts to 100 parts of the epoxy resin.

It is also possible to use concurrently various conventional curing agents known to be a latent-type curing agent such as acid anhydrides, dicyandiamide, melamine, guanamine, dibasic acid hydrazides, imidazole compounds, and the like. Also, other additives may optionally be added as necessary to the one-pack type heat curing epoxy resin composition of the present invention. As such additives, there may be mentioned inorganic powdery materials such as alumina, silica, silica powder, talc, bentonite, calcium carbonate, and cement; asbestos, glass fibers, synthetic fibers, mica, metal powder, as well as thixotropic agent or similar materials. Also, if necessary, other diluent and flame retardants may be added.

EXAMPLES

Followings are examples of the present invention. The present invention is not limited to the range of the working examples.

Curing Agent Preparation 1

In a four necked flask equipped with a thermometer, a reflux condenser, a stirrer and a dropping funnel, were blended 213.0 g (1.5 moles) of 1,3-bisaminomethylcyclohexne and 204.0 g (1.5 moles) of metaxylylenediamine under a flow of nitrogen, and they were heated to 100° C. While maintaining the temperature at 100° C., was added dropwise 190.0 g (1.0 equivalent) of ARALDITE GY-260 (Japan Ciba Geigy, bisphenol A type epoxy resin, epoxy equivalent weight about 190) with stirring. After dropwise addition was complete, they were heated at 120° C. for two hours with stirring to yield an amine-epoxy adduct, to which were added 153.0 g (1.5 moles) of dimethylaminopropylamine, 49.5 g (0.5 mole) of cyclohexylamine and 210.0 g (3.5 moles) of urea. The mixture was gradually heated to 200° C. under a flow of nitrogen with stirring, and the temperature was maintained for two hours. The resulting reaction product was a light yellow transparent solid which can be easily divided. The obtained product is designated as curing agent A.

Curing Agent Preparation 2

In the same manner as in Curing Agent Preparation 1, 319.5 g (2.25 moles) of 1,3-bisaminomethylcyclohexane was heated to 100° C., and while maintaining the temperature at 100° C., 285.0 g (1.5 equivalents) of ARALDITE GY-260 was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 180.0 g (3.0 moles) of urea, and the mixture was heated gradually up to 200° C. under a flow of nitrogen with stirring and the temperature was maintained for two hours. The obtained reaction product was a light yellow transparent solid which can be easily divided. It is designated as curing agent B.

Curing Agent Preparation 3

In the same manner as in Curing Agent Preparation 1, 255.0 g (1.5 moles) of isophoronediamine was heated to 100° C., and while maintaining the temperature at 100° C., 190.0 g (1.0 equivalent) of ARALDITE GY-260 was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 120.0 g (2.0 moles) of urea, and the mixture was heated gradually up to 200° C. under a flow of nitrogen with stirring and the temperature was maintained for two hours. The obtained reaction product was a light yellow transparent solid which can be easily divided. It is designated as curing agent C.

Curing Agent Preparation 4

In the same manner as in Curing Agent Preparation 1, 425.0 g (2.5 moles) of isophoronediamine was heated to 100° C., and while maintaining the temperature at 100° C., 380.0 g (2.0 equivalents) of ARALDITE GY-260 was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 150.0 g (2.5 moles) of urea, and the mixture was heated gradually up to 200° C. under a flow of nitrogen with stirring and the temperature was maintained for two hours. The obtained reaction product was a light yellow transparent solid which can be easily divided. It is designated as curing agent D.

Curing Agent Preparation 5

In the same manner as in Curing Agent Preparation 1, 255.0 g (1.5 moles) of isophoronediamine was heated to 100° C., and while maintaining the temperature at 100° C., 175.0 g (1.0 equivalent) of EPICRON 830 (a product of Dainippon Ink & Chamicals I.N.C.; bisphenol F type epoxy resin; epoxy equivalent weight 175) was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 120.0 g (2.0 moles) of urea, and the mixture was heated gradually up to 190° C. under a flow of nitrogen with stirring and the temperature was maintained for two hours. The obtained reaction product was a light yellow transparent solid which can be easily divided. It is designated as curing agent E.

Curing Agent Preparation 6

In the same manner as in Curing Agent Preparation 1, 382.5 g (2.25 moles) of isophoronediamine was heated to 110° C., and while maintaining the temperature at 110° C., 190.0 g (1.0 equivalent) of ARALDITE GY-260 and 67.5 g (0.5 equivalent) of GOT (a product of Nippon Kayaku K.K.; glycidyl orthotoluidine) was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 150.0 g (2.5 moles) of urea, and the mixture was heated gradually up to 180° C. under a flow of nitrogen with stirring and the temperature was maintained for two hours. The obtained reaction product was a light yellow transparent solid which can be easily divided. It is designated as curing agent F.

Curing Agent Preparation 7

In the same manner as in Curing Agent Preparation 1, 340.0 g (2.0 moles) of isophoronediamine was heated to 110° C., and while maintaining the temperature at 110°

C., 95.0 g (0.5 equivalent) of ARALDITE GY-260 and 61.0 g (0.5 equivalent) of GAN (a product of Nippon Kayaku K.K.; diglycidylaniline) was added dropwise with stirring. After dropwise addition was complete, they were heated at 120° C. for two hours with stirring to yield an amine-epoxy adduct. To this adduct, were added 204.0 g (2.0 moles) of dimethylaminopropylamine and 150.0 g (2.5 moles) of urea, and the mixture was heated gradually up to 190° C. under a flow of nitrogen with stirring and the temperature was maintained for two hours. The obtained reaction product was a light yellow transparent solid which can be easily divided. It is designated as curing agent G.

Curing Agent Preparation 8

In the same manner as in Curing Agent Preparation 1, 297.5 g (1.75 moles) of isophoronediamine was heated to 125° C., and while maintaining the temperature at 125° C., 135.0 g (1.0 equivalent) of GOT was added dropwise with stirring. After dropwise addition was complete, they were heated at 130° C. for two hours with stirring to yield an amine-epoxy adduct. To this adduct, were added 76.5 g (0.75 mole) of dimethylaminopropylamine, 133.8 g (1.25 moles) of benzylamine and 135.0 g (2.25 moles) of urea, and the mixture was heated gradually up to 180° C. under a flow of nitrogen with stirring and the temperature was maintained for two hours. The obtained reaction product was a light yellow transparent solid which can be easily divided. It is designated as curing agent H.

Examples 1 to 16

Curing Agents A to H obtained in Curing Agent Preparations 1 to 8 were each finely divided and dispersed in ARALDITE GY-260 together with AEROSIL 300 (a product of Nippon Aerosil K.K.; a particulate anhydrous silica), and these compositions were tested for curing characteristics and storage stability.

Comparative Examples 1 to 2

In a four necked flask equipped with a thermometer, a reflux condenser, and a stirrer, were blended 102.0 g (1.0 mole) of dimethylaminopropylamine, 177.5 g (1.25 moles) of 1,3-bisaminomethylcyclohexane and 105.0 g (1.75 moles) of urea, and they were heated up to 210° C. under a flow of nitrogen with stirring, and the temperature was maintained for three hours. The obtained reaction product was a colorless transparent solid which can be easily divided. The obtained curing agent is designated as J, different amounts of which in finely divided form were dispersed in ARALDITE GY-260 together with AEROSIL 300. These compositions were tested for curing characteristics and storage stability.

Comparative Examples 3 to 5

Finely divided dicyandiamide and/or DCMU (3-(3,4-dichlorophenyl)-1,1-dimethylurea) were dispersed in ARAL-DITE GY-260 together with AEROSIL 300 and these compositions were tested in the same manner as above.

1. Evaluation of Curing Characteristics

On an iron plate maintained at various temperatures, 0.1 to 0.2 gram of a sample was placed, and the lapse of time until the sample gelled was recorded.

2. Evaluation of Storage Stability

A sample was placed in a thermostatic chamber at 45° C. and days until the sample looses its fluidity were recorded.

The test results for these properties are shown in the tables.

TABLE 1

| Example No. | 1 | 2 | 3 | 4 | 5 | 6 | 7 | 8 | 9 | 10 | 11 | 12 | 13 | 14 | 15@ | 16 |
|---|---|---|---|---|---|---|---|---|---|---|---|---|---|---|---|---|
| Epoxy compound | 100 | 100 | 100 | 100 | 100 | 100 | 100 | 100 | 100 | 100 | 100 | 100 | 100 | 100 | 100 | 100 |
| Curing agent A | 10 | 20 | | | | | | | | | | | | | | |
| Curing agent B | | | 10 | 20 | | | | | | | | | | | | |
| Curing agent C | | | | | 10 | 20 | | | | | | | | | | |
| Curing agent D | | | | | | | 10 | 20 | | | | | | | | |
| Curing agent E | | | | | | | | | 10 | 20 | | | | | | |
| Curing agent F | | | | | | | | | | | 10 | 20 | | | | |
| Curing agent G | | | | | | | | | | | | | 10 | 20 | | |
| Curing agent H | | | | | | | | | | | | | | | 10 | 20 |
| AEROSIL 300 | 1 | 1 | 1 | 1 | 1 | 1 | 1 | 1 | 1 | 1 | 1 | 1 | 1 | 1 | 1 | 1 |
| Curing time (min.) | | | | | | | | | | | | | | | | |
| 120° C. | 5.8 | 2.6 | 3.6 | 1.6 | 1.8 | 1.1 | 1.8 | 1.0 | 1.5 | 0.9 | 1.9 | 1.0 | 1.7 | 0.9 | 3.2 | 1.5 |
| 100° C. | 18.2 | 7.8 | 12.5 | 5.8 | 8.2 | 2.9 | 6.3 | 2.3 | 7.6 | 2.8 | 6.0 | 2.3 | 5.3 | 2.2 | 5.3 | 2.9 |
| 80° C. | 60< | 41.3 | 60< | 35.3 | 60< | 27.4 | 37.5 | 15.3 | 58 | 16.6 | 37.5 | 15.3 | 60< | 18.7 | 14.7 | 10.7 |
| Storage stability (days) | 30< | 30< | 30< | 30< | 30< | 30< | 30< | 30< | 30< | 30< | 30< | 30< | 30< | 30< | 30< | 30< |

TABLE 2

| Comparative Example No. | 1 | 2 | 3 | 4 | 5 |
|---|---|---|---|---|---|
| Epoxy compound | 100 | 100 | 100 | 100 | 100 |
| Curing agent J | 10 | 20 | | | |
| dicyandiamide | | | 10 | 10 | |
| DCMU* | | | | 5 | 10 |
| AEROSIL 300 | 1 | 1 | 1 | 1 | 1 |
| Curing time (min.) | | | | | |
| 120° C. | 10.2 | 3.8 | 60< | 8.8 | 28.4 |
| 100° C. | 60< | 60< | 60< | 34.2 | 58.8 |
| 80° C. | 60< | 60< | 60< | 60< | 60< |
| Storage stability (days) | 30< | 30< | 30< | 9 | 3 |

*3-(3,4-dichlorophenyl)-1,1-dimethylurea

We claim:
1. A one-pack epoxy resin composition comprising as its effective components
   (a) at least one epoxy resin having more than one epoxy group in a molecule, and
   (b) a curing agent prepared by either
      (I) reacting
         (a) at least one diamine compound having two primary amino groups,
         (b) at least one N,N-dialkylaminoalkylamine represented by the general formula

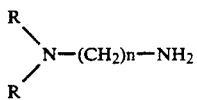

wherein R is alkyl group of 1 to 4 carbon atoms, and n is an integer of 2 or 3, and as an optional component, (e) at least one monoamine compound represented by the general formula X—NH₂ wherein X is benzyl, cyclohexyl, or alkyl group of 3 to 8 carbon atoms with (c) at least one epoxy resin having more than one epoxy group in a molecule, and (d) urea wherein components (a), (b) and (c) have been reacted and subsequently followed by further reaction with the urea at 150°-240° C. for 1-5 hours, or (II) reacting (a) at least one diamine compound having two primary amino groups, (c) at least one epoxy resin having more than one epoxy group in a molecule to obtain an amine-epoxy adduct, to which is added (b) at least one N,N-dialkylaminoalkylamine represented by the general formula

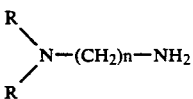

wherein R is alkyl group of 1 to 4 carbon atoms, and n is an integer of 2 or 3, and (e) optionally at least one monoamine compound represented by the general formula X—NH₂ wherein X is benzyl, cyclohexyl, or alkyl group of 3 to 8 carbon atoms with (d) urea wherein components (a), (b) and (c) have been reacted and subsequently followed by further reaction with the urea at 150°-240° C. for 1-5 hours.

2. A composition according to claim 1 wherein the curing agent is prepared by procedure (I).

3. A composition according to claim 1 wherein the curing agent is prepared by procedure (II).

* * * * *